United States Patent
Nicora et al.

(10) Patent No.: US 9,132,345 B2
(45) Date of Patent: *Sep. 15, 2015

(54) METHODS AND SYSTEMS FOR SPORTS SIMULATION

(71) Applicant: FULL-SWING GOLF, INC., San Diego, CA (US)

(72) Inventors: Daniel Antonio Nicora, Temecula, CA (US); Brian Arnold, San Diego, CA (US)

(73) Assignee: FULL-SWING GOLF, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/306,081

(22) Filed: Jun. 16, 2014

(65) Prior Publication Data
US 2014/0295924 A1    Oct. 2, 2014

Related U.S. Application Data

(63) Continuation of application No. 12/688,659, filed on Jan. 15, 2010, now Pat. No. 8,758,103.

(60) Provisional application No. 61/145,683, filed on Jan. 19, 2009.

(51) Int. Cl.
| | | |
|---|---|---|
| A63F 9/24 | (2006.01) |
| A63F 13/00 | (2014.01) |
| A63B 24/00 | (2006.01) |
| A63B 69/36 | (2006.01) |
| A63B 69/00 | (2006.01) |
| A63B 71/04 | (2006.01) |
| A63B 71/06 | (2006.01) |

(52) U.S. Cl.
CPC ............ *A63F 13/005* (2013.01); *A63B 24/0021* (2013.01); *A63B 69/3658* (2013.01); *A63B 69/002* (2013.01); *A63B 71/04* (2013.01); *A63B 2024/0031* (2013.01); *A63B 2024/0034* (2013.01); *A63B 2071/0647* (2013.01); *A63B 2207/02* (2013.01); *A63B 2220/30* (2013.01); *A63B 2220/35* (2013.01); *A63B 2220/806* (2013.01); *A63B 2220/807* (2013.01); *A63B 2220/808* (2013.01)

(58) Field of Classification Search
CPC ........... A63B 69/3658; A63B 24/0021; A63B 24/0034; A63B 2220/30; A63B 2220/35; A63B 2220/805; A63B 2220/806; A63B 2220/807
USPC ........... 463/2, 3; 476/151, 155, 156; 382/103, 382/106, 107
See application file for complete search history.

(56) References Cited

U.S. PATENT DOCUMENTS

| | | | | |
|---|---|---|---|---|
| 4,150,825 A | * | 4/1979 | Wilson | 473/152 |
| 5,333,874 A | * | 8/1994 | Arnold et al. | 473/156 |
| 5,443,260 A | * | 8/1995 | Stewart et al. | 473/451 |

(Continued)

*Primary Examiner* — Michael Cuff
(74) *Attorney, Agent, or Firm* — Procopio, Cory, Hargreaves & Savitch LLP; Noel C. Gillespie

(57) ABSTRACT

A sports simulator calculates the rotational and translational velocity of a sports object. The rotational velocity is calculated using image analysis. The translational velocity is calculated using image analysis and a set of emitters and sensors. The simulator then computes the future trajectory of the sports object based on the rotational and translational velocity. In one embodiment, the sports object is a golf ball and the sports simulator simulates golf.

9 Claims, 6 Drawing Sheets

(56) References Cited

U.S. PATENT DOCUMENTS

| | | | |
|---|---|---|---|
| 5,846,139 A * | 12/1998 | Bair et al. | 473/156 |
| 5,926,780 A * | 7/1999 | Fox et al. | 702/142 |
| 6,042,483 A * | 3/2000 | Katayama | 473/199 |
| 6,304,665 B1 * | 10/2001 | Cavallaro et al. | 382/106 |
| 8,085,188 B2 * | 12/2011 | Tuxen | 342/173 |
| 2004/0032970 A1 * | 2/2004 | Kiraly | 382/103 |
| 2004/0248662 A1 * | 12/2004 | Gobush et al. | 473/199 |
| 2005/0023763 A1 | 2/2005 | Richardson | |
| 2005/0122422 A1 * | 6/2005 | Kent et al. | 348/371 |
| 2006/0063574 A1 * | 3/2006 | Richardson et al. | 463/1 |
| 2009/0042627 A1 * | 2/2009 | Nicora | 463/2 |

* cited by examiner

METHODS AND SYSTEMS FOR SPORTS SIMULATION

CROSS-REFERENCE TO RELATED APPLICATIONS

The present application is a continuation of U.S. patent application Ser. No. 12/688,659, filed on Jan. 15, 2010, which claims the benefit of U.S. Provisional Patent Application Ser. No. 61/145,683, filed on Jan. 19, 2009, the contents of each of which are hereby incorporated by reference in their entirety.

BACKGROUND

1. Field of the Invention

The present invention relates generally to computer based sports simulators, and more particularly to systems for predicting the future trajectory of a sports object.

2. Description of the Related Art

Golf is a sport that is continuing to grow in popularity. One of golf's main attractions to enthusiasts is the continual challenge of improving one's game. To become an adept golfer and to maintain golfing proficiency, a significant amount of practice is required. However, few enthusiasts have the available time required to play full rounds of golf or to practice hitting golf balls at outdoor driving ranges. To solve this problem, many have found indoor golf simulators to be a viable alternative.

Golf simulators have been introduced for providing an indoor facility in which a golfer can practice all aspects of the golfing game. In order for a golf simulator to accurately predict the future trajectory of a golf ball, a golf simulator should measure the translational and rotational velocity of the golf ball. However, golf simulators designed to measure the translational and rotational velocity are typically expensive. Therefore, it is desirable to have a golf simulator that accurately computes the translational and rotational velocity of a golf ball in a cost effective manner.

SUMMARY

The system, methods, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the features of this invention provide advantages over other sports simulators.

One aspect of the invention is to create an inexpensive sports simulator, especially for simulating golf. In one such embodiment, the invention comprises a method for simulating a sports activity comprising detecting the launch of a sports object, capturing one or more images of the object, determining a first position of the object based at least in part on at least one of the one or more images, sensing passage of the object through a plane located between a launch area and a screen, determining a second position of the object based on the sensing, determining one or more components of the translational velocity of the object based at least in part on the first position and second position of the object, determining one or more components of rotational velocity of the object based at least in part on the one or more images, computing a future trajectory of the object based at least in part on the one or more components of rotational velocity and the one or more components of translational velocity, and displaying the future trajectory of the object.

An apparatus for simulating a sports activity wherein the future trajectory of a sports object is predicted is also provided. The apparatus comprises one or more strobe lights, a strobe controller coupled to the strobe lights, a triggering device coupled to the strobe controller to flash the strobe lights, at least one camera configured to capture images of the object illuminated by the one or more strobe lights, one linear array of emitters for transmitting electromagnetic radiation, one or two linear arrays of receivers positioned to receive light from at least one of the emitters and to generate a signal in response thereto, a computer that computes the predicted trajectory of the sports object, wherein the computer computes the spin of the sports object based at least in part on the captured images and computes the translational velocity based at least in part on at least one captured image and the signal, and a display that shows the predicted trajectory of the sports object.

In another embodiment, a system for computer generated animation comprises a processor configured to: detect the launch of a sports object; capture one or more images of the object, determine a first position of the object based at least in part on at least one of the one or more images, sense passage of the object through a plane located between the launch area and the screen and generating a signal in response thereto, determine a second position of the object based at least in part on the signal, determine one or more components of the translational velocity of the object based at least in part on the first position and second position of the object; determine one or more components of rotational velocity of the object based at least in part on the one or more images, compute a future trajectory of the object based at least in part on the one or more components of rotational velocity and the one or more components of translational velocity, and display the future trajectory of the object.

In another embodiment, a method for simulating putting in a golf simulator comprises sensing a golf ball rolling through a first plane located between a launch area and a screen, determining a first position of the golf ball based at least in part on the sensing, sensing the golf ball rolling through a second plane located between the first plane and the screen, determining a second position of the golf ball based at least in part on the second sensing, determining one or more components of the translational velocity of the object based at least in part on the first position and second position of the object, computing a future trajectory of the object based at least in part on the one or more components of translational velocity, and displaying the future trajectory of the object.

DETAILED DESCRIPTION

Figure 1:
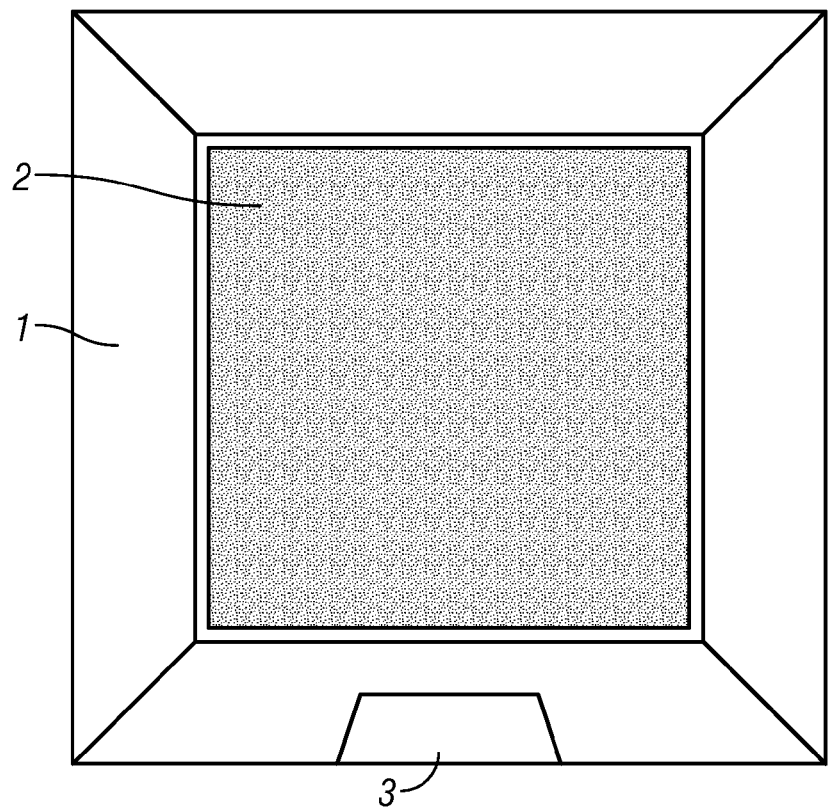
FIG. 1 is an illustration of one embodiment of a sports simulator.

The following detailed description is directed to certain specific embodiments of the development. However, the development can be embodied in a multitude of different ways as defined and covered by the claims. In this description, reference is made to the drawings wherein like parts are designated with like numerals throughout.

Golf simulators allow a player to practice his golf swing year round. In order for a golf simulator to provide useful practice, a simulator should accurately calculate the trajectory of the golf ball in response to a player's swing. This requires that a simulator calculate both the rotational velocity and translational velocity of the golf ball. However, a sports simulator designed to measure both rotational and translational velocity is typically expensive. Thus, it is desirable to lessen the cost of such a simulator without decreasing the accuracy of the prediction of the golf ball's trajectory.

Translational velocity may be measured based on two points at which the time and position of an object is known. The system described in Arnold, et al (U.S. Pat. No. 5,333,874) describes one method for calculating the translational velocity in a sports simulator using two sets of IR emitters where each set of IR emitters has a corresponding set of IR sensors. The time and position of a sports object as it passes through the first set of emitters can be compared to the time and position of the sports object as it passes through the second set of emitters. Based on these measurements, the translational velocity can be computed. However, the two sets of emitters and sensors add significant expense to the golf simulator. In fact, the set of IR emitters and sensors may each cost between $30,000 and $50,000.

A less expensive sports simulator may compute the translational velocity of a sports object using only one set of IR emitters and sensors. The initial position of the sports object can be determined using images captured by a camera. A triggering device can be used to determine when the sports object is launched. Thus, the triggering device detects the time at which the sports object left the initial position captured in the images. That initial position and the time determined by the triggering device can be compared to the position and time that the sports object passes through a single set of IR emitters and sensors. Because only one set of IR emitters and sensors is used, the cost of such a simulator is drastically decreased.

In addition to translational velocity, the rotational velocity of a sports object should also be known in order to accurately predict the future trajectory of the sports object. A camera may additionally be used to determine the rotational velocity of the sports object. The camera may capture multiple images and compare the sports object's position in the images to determine the sports object's spin. In order to determine the time between images, strobe lights and a strobe controller may be used. A strobe controller may control a set of strobe lights so that the lights strobe at regular intervals. The strobe lights illuminate the sports object so that clean images can be taken. Thus, the rotational velocity can be computed from the sport's objects two rotational positions and the time between strobes. Exemplary embodiments of methods and systems for determining the rotational velocity of a sports object are described in U.S. Patent Publication No. 2009-0042627 (corresponding to U.S. patent application Ser. No. 11/837,289), the entire contents of which is incorporated herein by reference.

Aspects of the invention will now be described with reference to the Figures. Referring first to FIG. 1, a sports simulator is illustrated. Common characteristics of a sports simulator include a simulator enclosure 1, a display or screen 2, and a launch area 3. A sports object may be accelerated from the launch area 3 towards the display 2. For example, a player could drive, pitch, or putt a golf ball towards the display 2. In some embodiments, no actual simulator enclosure 1 is provided, and the launch area 3 and the display 2 are set up in a room or even outdoors. The display 2 may have an image thereon appropriate for the sport being simulated. The display 2 may be of a suitable material and surface to project a video image upon it. In one embodiment, the image may be projected on the display 2 using a projector mounted in an area away from possible flight paths of the sports object.

The sports object will typically comprise a ball of some kind. For example, a soccer ball could be kicked toward an image of a goal. In another example, the sports object is a golf ball, and the image on the display 2 is a fairway, green, or other part of a golf course. In these embodiments, after the golf ball hits the display 2, an image of the ball following a predicted trajectory is generated and shown on display 2 to simulate a golf shot in the displayed golf course. Although golf simulation is a particularly advantageous application of the inventions described herein, it will be appreciated that other sports simulation could be performed in accordance with the principles described.

Figure 2:
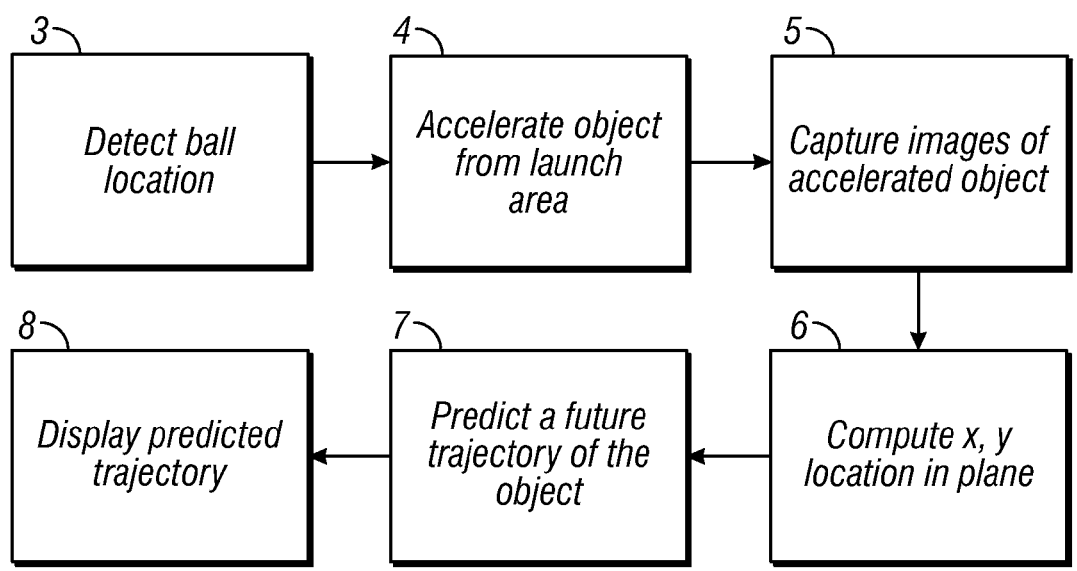
FIG. 2 is block diagram illustrating one embodiment of a sports simulator.

Referring now to FIG. 2, a block diagram is shown illustrating one method according to this aspect of the invention for simulating golf. As mentioned above, displaying an image of the golf ball trajectory on the display screen in an accurate manner requires an evaluation of the vector velocity and spin imparted to the object by the golf club at impact. The simulation begins at block 3 with the detection of the location of the golf ball within the launch area. Launch time can be determined by sensing the sound of the club striking the ball with a microphone. Once the object is in motion at block 4, multiple images of the golf ball are captured at block 5. Components of rotational velocity of the golf ball may be calculated as the object travels towards the display 2 from these multiple images. At block 6, the x,y position of the golf ball as it passes through a vertical plane on its path to the screen 2 is determined. The time lapse between the initial club strike and the time the ball passes through the vertical plane can be determined by the same detection mechanism. Translational velocity vectors can be determined by the initial position of the ball, the position of the ball as it passes through the vertical plane, and the time lapse between the ball strike and the ball passing through the vertical plane. With the velocities calculated, a prediction of the future trajectory 7 is ascertained and then displayed 8 on the screen 2.

Figure 3:
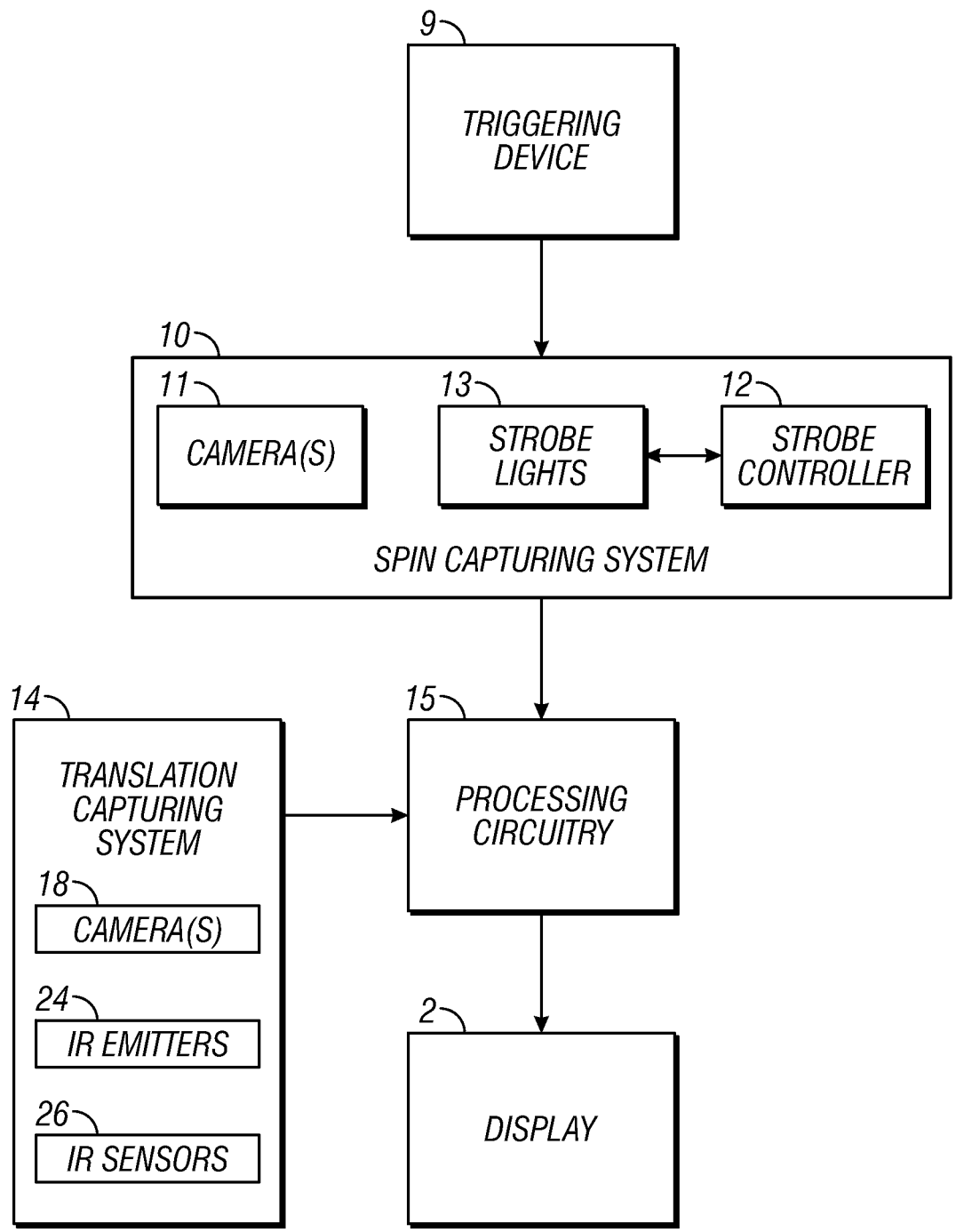
FIG. 3 is an illustration of another embodiment of a sports simulator.

FIG. 3 illustrates an apparatus for simulating a sports activity that may be used to implement the method of FIG. 2. The apparatus contains the display 2, a triggering device 9, a processing circuitry 15, a translation capturing system 14, and a spin capturing system 10. In this embodiment, the triggering device 9 begins the operation of the simulator when it detects when a sports object leaves the launch area 3. The triggering device 9 may comprise, for example, a motion detector, a microphone, or a combination of both. The triggering device can detect when an object is struck in the launch area 3 and trigger the operation of the spin capturing system 10 and translation capturing system 14.

Predicting the future trajectory of a sports object requires the calculation of both translational velocity and rotational velocity. Thus, the simulator contains translation capturing system 14 and spin capturing system 10. The spin capturing system 10 may be comprised of a single or multiple cameras 11 and a lighting system. The lighting system in one embodiment is comprised of a strobe controller 12 coupled to one or more strobe lights 13. The lighting system is preferably sufficient to evenly illuminate the field of view of the object to the field of view has similar contrast. Greater light intensity will generally be used the further the spin capturing system 10 is away from the object. The translation capturing system 14 may contain, for example, one or more cameras 18, IR emitters 24, and IR sensors 26. In one embodiment, only one camera is used to perform the functions of both camera 18 and camera 11.

Processing circuitry 15 is configured to compute rotational and translational velocity based on information received from the translation capturing system 14 and the spin capturing system 10. For example, processing circuitry 15 can be configured to compute components of rotational velocity based at least in part on the images captured by the spin capturing system 10. The processing circuitry 15 can also compute the translational velocity of the object and then combine it with the computed rotational velocity to compute a future trajectory of the object. When the object reaches the display 2 or soon thereafter, the future trajectory has been computed and is then displayed on the screen 2.

In one embodiment, a computer houses the processing circuitry 15 and controls the simulation. From the computer, a player can select various options of game play which may include practice modes and golf course selection. Other configuration settings such as trigger timings, delays, and microphone sensitivity may also be controlled from the computer.

Figure 4:
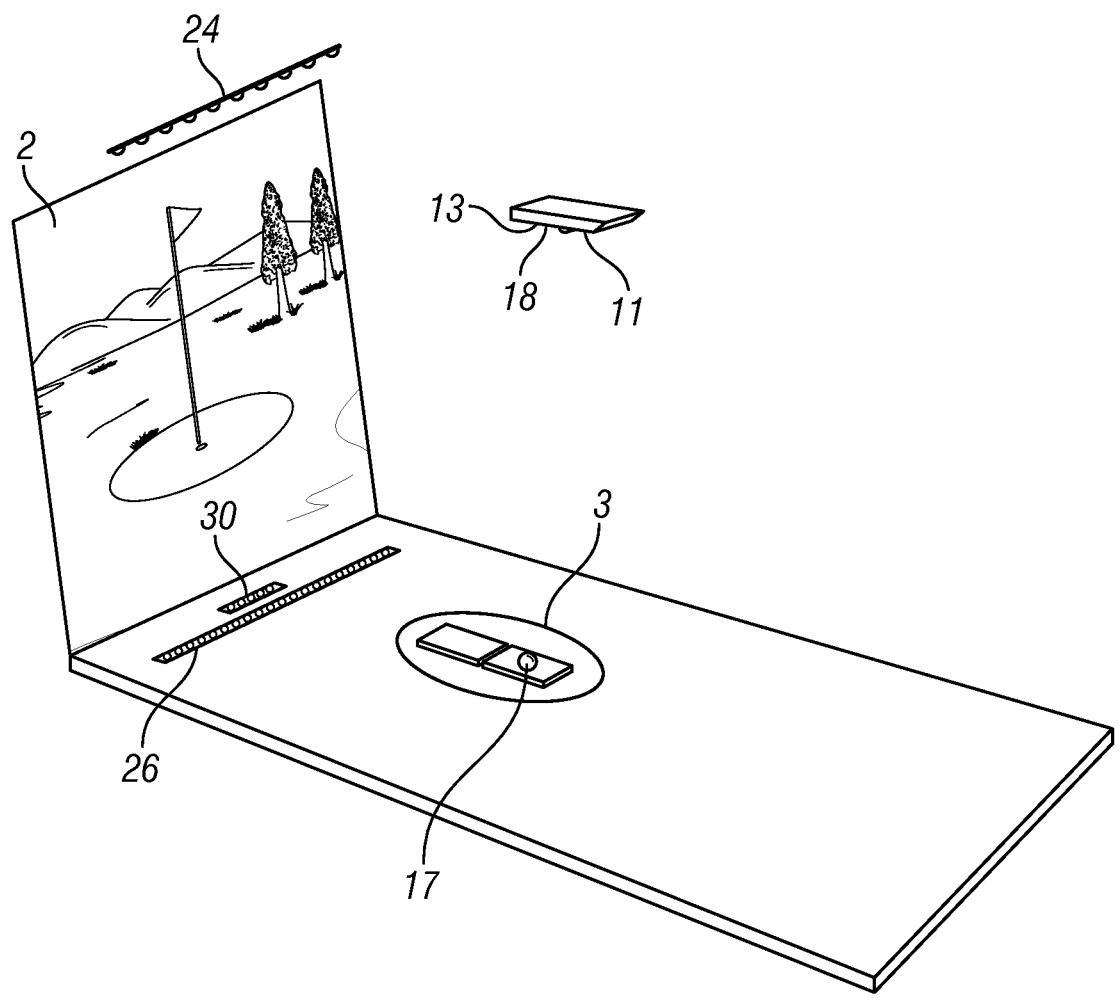
FIG. 4 is an illustration of yet another embodiment of a sports simulator.

FIG. 4 is an illustration of one embodiment of a sports simulator. A golfer may stand in the launch area 3 of the simulator and can drive, pitch, or putt a golf ball 17 towards the screen 2. The IR sensors 26 are located between the launch area 3 and the display 2. The IR emitters 24 are located such that the light emitted from the IR emitters 24 can be detected by at least one of the IR sensors 26. The camera 18 is positioned so that it can capture an image of the launch area 3. The strobe lights 13 are positioned so that they provide light for the camera 11. The camera 11 is located such that it can capture an image of the sports object as it travels from the launch area 3 to the display 2.

Figure 5:
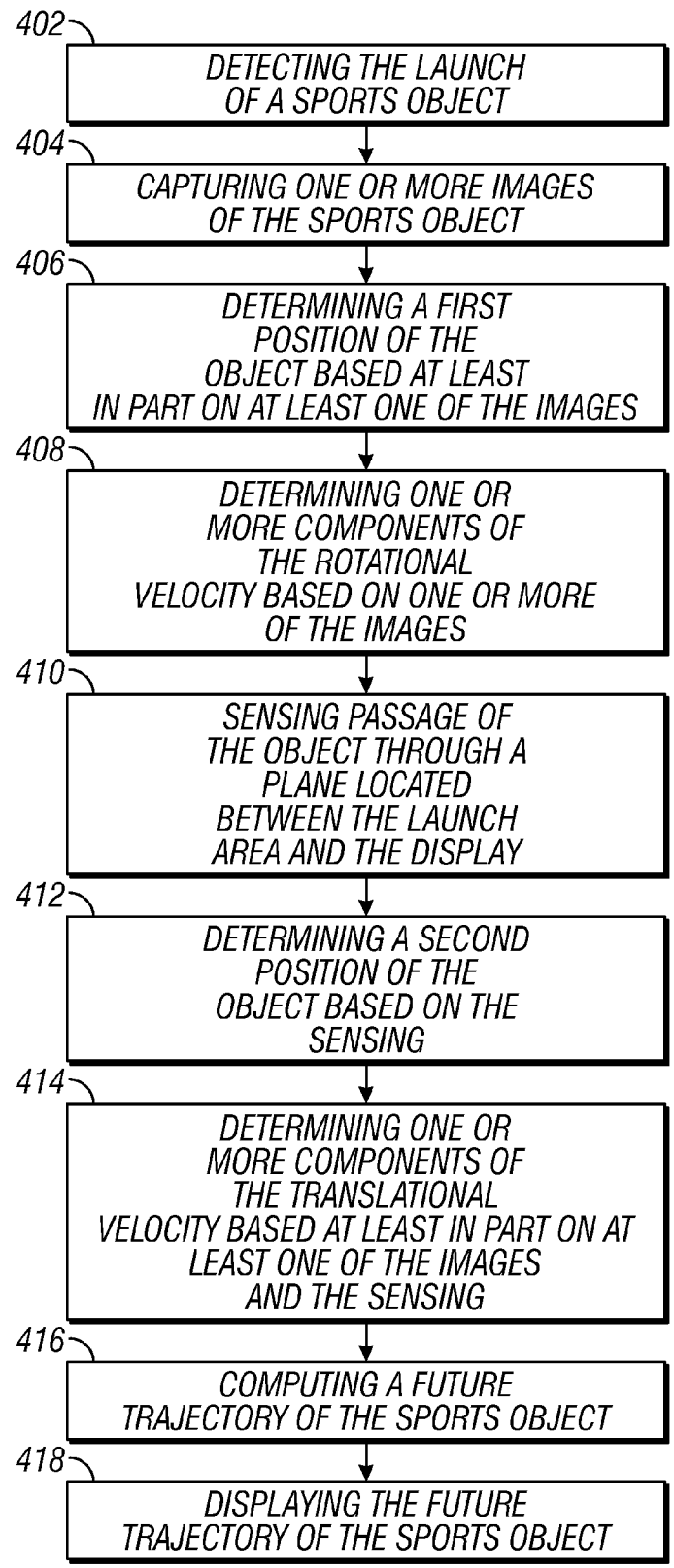
FIG. 5 is a block diagram illustrating one embodiment of a method of simulating a sport.

Referring now to FIG. 5, a block diagram is shown illustrating one method of simulating a sports activity with a sports simulator. Beginning at block 402, the triggering device 9 detects the launch of the sports object in the launch area 3. The triggering device 9 begins the operation of the simulator. As noted above with respect to FIG. 3, the triggering device 9 may comprise, for example, a motion detector, a microphone, or a combination of both. In one embodiment, launch time can be determined by sensing the sound of a golf club striking a golf ball with a microphone.

Moving to block 404, the camera 18 captures images of the sports object. The images acquired by camera 18 may be used to determine where in the launch area the ball is positioned before it is struck. Image analysis can be used to locate multiple sports objects in the field of view of the camera 18 and to determine which sports object was struck by detecting motion of a previously identified stationary ball or sports object. As shown in FIG. 4, the camera 18 is located so that the launch area 3 is within its view.

Proceeding to block 406, the processing circuitry 15 determines based on the images from camera 18 a first position of the sports object. This initial position is used as a first position for determining translational velocity. The time at which the triggering device 9 detects the launch of the sports object is used as the time that the sports object was at the initial position calculated at block 404. The position and time are used as the initial point in calculating translational velocity.

The camera 18 can also be adjusted for different tee placements for right and left handed players. In general, because the sports object can be struck at a variety of locations on the launch area 3, the camera 18 axis can be tilted slightly to point to the sports object prior to impact and will often be only approximately rather than exactly vertical.

At block 408, the processing circuitry 15 determines one or more components of the rotational velocity of the sports object. Once the sports object is launched towards the display 2, the camera 11 takes multiple images of the sports object in motion. The images acquired by the camera 11 are processed to produce a measure of the change in angular orientation of the sports object between two or more images. The strobe controller 12 and strobe lights 13 of the spin capturing system 10 work in conjunction with the camera 11. The strobe controller 12 controls the strobe lights 13 so that they strobe at regular intervals. Knowing the time span between strobes, a rotational velocity can be derived. Thus, using multiple strobes on a systematic inter-strobe time period can capture at least two clean images of the object to analyze. The processing circuitry 15 uses the change in the orientation of the sports object in the images to calculate rotational velocity.

Figure 6:
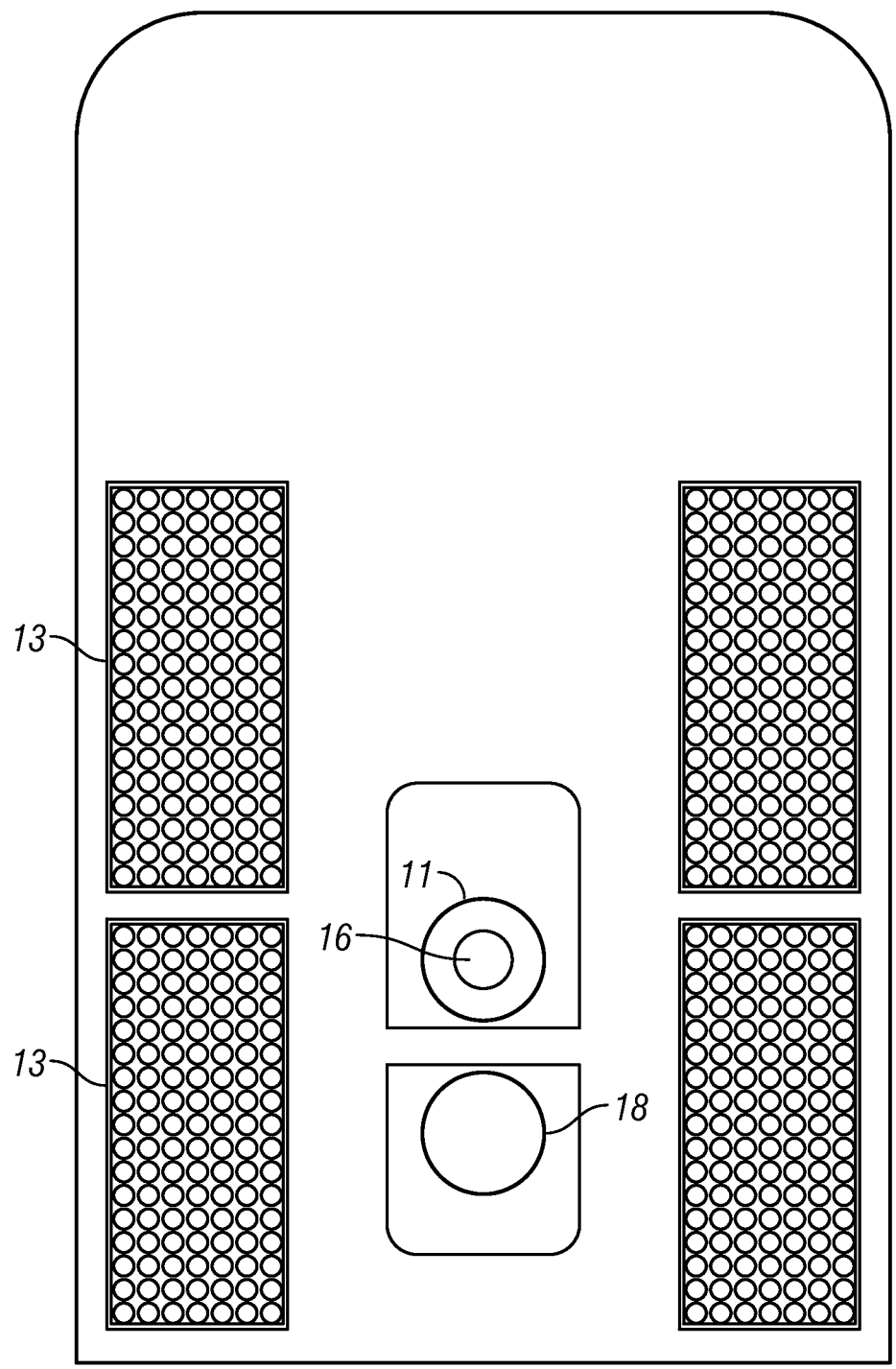
FIG. 6 is an illustration of camera and strobe lights in one embodiment of a sports simulator.

Referring now to FIG. 6, the spin capturing system 10 is shown in more detail. The strobe lights 13 may be placed along the side of the camera 11 to illuminate and acquire images of the sports object as it leaves the launch area 3, such as when the golf ball leaves the tee. As noted above with respect to FIG. 3, the lighting system is preferably sufficient to evenly illuminate the field of view of the sports object so the field of view has similar contrast. Greater light intensity will generally be used the further the spin capturing system 10 is away from the sports object. To minimize the disturbance of flashing strobes lights 13 on the player hitting the sports object, the strobe lights 13 are advantageously configured to emit infrared light, and the camera 11 may be a CCD and/or a CMOS camera configured to be sensitive to infrared light. To reduce noise from visible light sources, an infrared filter 16 may be coupled to the lens of the camera 11. A visible light camera 18 acquires images before the ball is struck to locate the initial ball position as set forth above.

One advantageous placement of the cameras 11 and the strobe lights 13 is above the launch area 3. In this embodiment, the camera axes may be approximately normal to the ground or floor. In these embodiments, the entire launch area is easily captured by the camera 18 that locates initial ball position. In addition, the top or back spin as well as spin defining hook and slice are easily visible to the spin acquisition camera 11. Furthermore, it has been found that advantageous shadows can be produced which enhance the edge detection process during image analysis. However, it will be appreciated that the camera 11 may also be placed to the side of the launch area 3. Other embodiments may have the camera 11 mounted on poles which are not oriented parallel or normal to the ground, although this makes the image analysis a bit more complex.

In order to allow accurate calculations of the velocity of the sports object, the spatial location and orientation of the camera 11 relative to the sports object are determined. This may be achieved by mounting an inclinometer on the camera 11 to determine the direction of the optical axis of the camera 11. Integrated circuit inclinometers are commercially available and can be used for this purpose. The spatial location of the camera 11 can be found by taking an image of an object from a known location, and based on the size of the object, the location of the camera 11 can be found and stored for use in the calculations of an object's spin.

The analysis of the images may be done using any suitable method. Generally, the first step of image analysis is to define the pixels in the one or more images that correspond to the sports object. This may be done by an edge detection method such as by binarizing the image and detecting the binary large objects (blobs). The blobs can be found by labeling each color characteristic of the object pixel that is connected to another. The appropriately shaped blobs represent the object whereas the other blobs are background artifacts. Another way to perform edge detection is to use the Canny or Sobel methods. Once the edges are found, the image processing algorithm can then pick out the edges for the round shapes which represent the object. Overlapping images of the sports object can be identified by the area and the shape of the blobs, those images can be discarded and used to know which imprint was made by which strobe. This gives a time period between two clean images of the object. Once that is done, the location of the object edges can be refined in order to more accurately pick out the shape and center of gravity of the object.

Once two clean images of the sports object are identified, the pixel values in each image can be compared to determine how much the object rotated between the two images and around what axes of rotation. Most objects have stamps on the poles and equator as well as identification marks put on the object by the manufactures. These marks move between images, and comparing their change in position allows a spin vector computation to be made. Even without intentionally created markings, sports objects will include texture on the surface that can be used in the image analysis in the same basic way. Although changes in object orientation between images can often be seen easily by eye, it can be complex to analyze automatically. However, methods to compute components of rotational velocity of a variety of objects have been developed using image analysis. Examples of such methods have been described in the articles *Tracking the Translational and Rotational Movements of the Ball using High Speed Camera Movies* by Hubert Shum et al., City University of Hong Kong, and *Measuring Ball Spin by Image Registration* by Toru Tamaki et al., Niigata University. Each of these articles is hereby incorporated by reference in its entirety.

In some such methods, the orientation of the object in each image is defined by Euler angles. The object pixel values of the first image are transformed by different Euler angle changes, and the Euler angle changes that best correlate the pixels of the first image to the pixels of the second image are determined to compute an orientation change between strobes. The Euler angle changes correspond to rotations about three orthogonal axes, which are preferably aligned to the frame of reference of the simulator. Generally, spin around a vertical axis through the center of the ball will define hook and slice. Spin around a horizontal axis through the center of the ball and parallel to the club face, for example, will determine top and/or back spin. Spin around a horizontal axis through the center of the sports object and approximately normal to the golf club face in a golf simulator will typically be negligible, and the computation can be simplified if spin around this axis is ignored. The spin vector may in these embodiments lie in the vertical plane that is approximately parallel to the club face.

Referring again to FIG. 5, the translation capturing system 14 senses the passage of the sports object through a plane located between the launch area 3 and the display 2 at block 410. Once the ball has left the launch area 3 and the images used to compute the initial location and spin have been captured, the sports object travels through a plane defined by the linear series of IR emitters 24 and the linear series 26 of IR sensors, shown in FIG. 4 as positioned between the launch area 3 and the display 2. The IR emitters 24 are also positioned such that the IR sensors 26 may detect at least a portion of the light from the IR emitters 24. A signal is generated indicating which IR sensors 26 detected light from the IR emitters 24.

Figure 7:
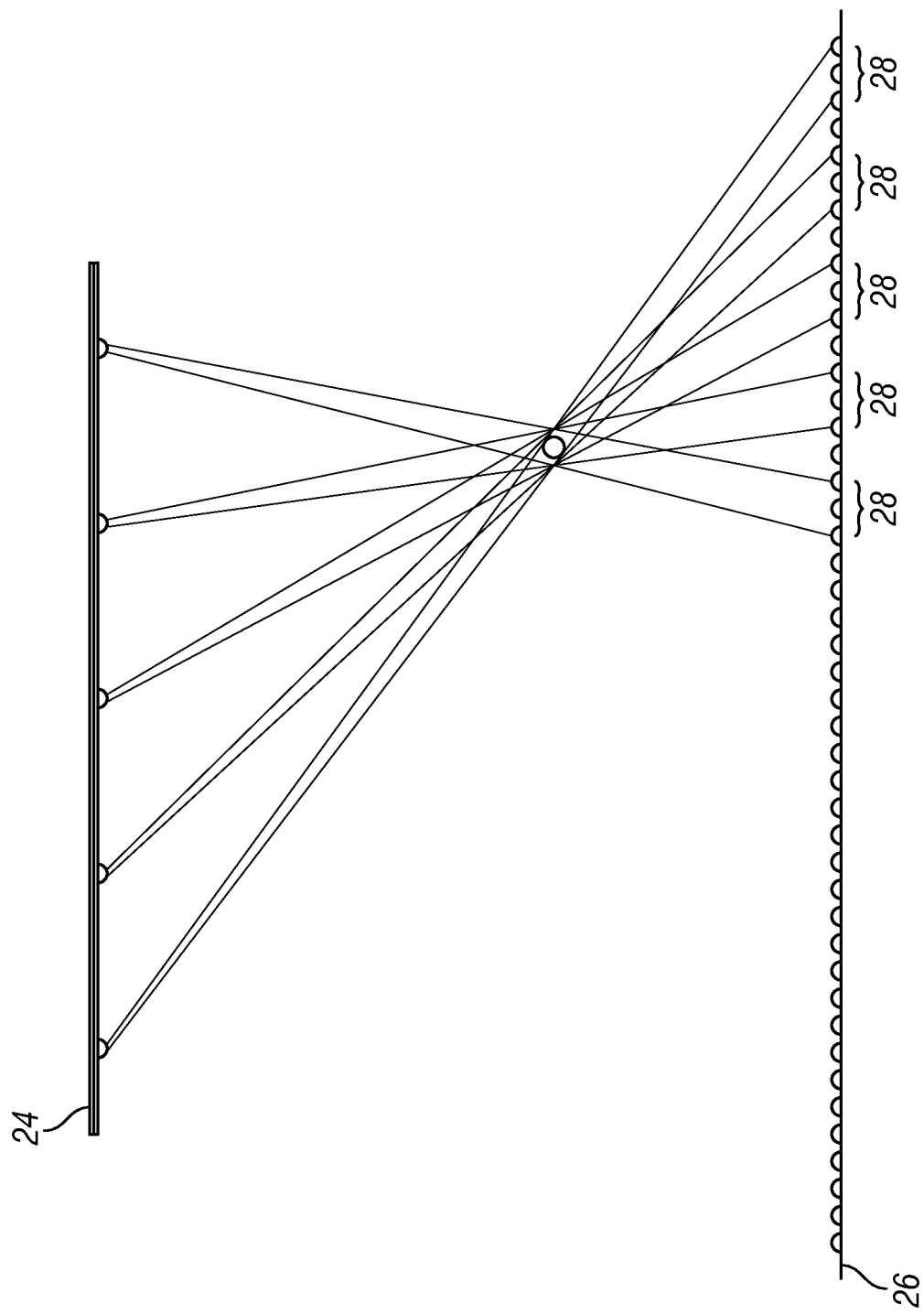
FIG. 7 is an illustration of an emitter and sensor array in one embodiment of a sports simulator.

FIG. 7 is a diagram illustrating the IR sensors 26 detecting light from some of the IR emitters 24. The x,y position of the ball can be determined within the plane by sequentially strobing different light sources in the series of the IR emitters 24. Each IR emitters 24 will illuminate all or essentially all the sensors of the strip of IR sensors 26 in the absence of the sports object in the plane.

Referring again to FIG. 5, the processing circuitry 15 determines a second position of the sports object based on the signal received from the translation capturing system 14 at block 412. As shown in FIG. 7, the sports object passes through a plane created by the IR emitters 24 and the IR sensors 26. When the sports object passes through this plane, different shadows 28 are produced when each different emitter is turned on. By detecting which IR sensors 24 do not receive a signal when each specific emitter is turned on, the x,y position of the sports object in the plane can be determined from the angles between each emitter and the respective blocked sensor(s). Because the strobing of the lights in the series of IR emitters 24 can occur at a duty cycle of several microseconds, multiple strobes of multiple emitters 24 can be performed as the sports object passes through the plane, even when travelling over 100 mph.

FIG. 7 shows five IR emitters 24, but more or fewer could be used. If the strobing of the emitters 24 begins at or near the initial trigger signal when the ball is struck, when shadows are detected, the time between shadow detection and initial ball strike can also be determined.

Moving to block 414 of FIG. 5, the processing circuitry 15 determines one or more components of the translational velocity of the sports object. Translational velocity vectors can be determined by the initial position of the ball, the position of the ball as it passes through the vertical plane, and the time lapse between the ball launch and the ball passing through the vertical plane of IR emitters 26 and IR sensors 24.

Proceeding to block 416, the processing circuitry 15 computes the future trajectory of the sports object based on the rotational and translational velocity. The future trajectory is calculated using methods known to one skilled in the art.

Finally at block 418, the future trajectory of the sports object is shown on the display 2. The future trajectory can be shown with a background of a golf course or other appropriate background in order to give the simulator a more realistic setting. The sports object can be shown, for example, moving through the picture on the display 2.

A similar method can be used for detecting the future trajectory of a sports object when the sports object stays on the ground, such as during putting. Another linear strip of IR sensors 30, shown in FIG. 4, can be placed between the first strip of IR sensors 26 and the display 2. For a putt, one or multiple emitters in the strip of IR emitters 24 can be turned on in a continuous mode, illuminating all the sensors in both strips of sensors 24 and 30. When the putt is made, the ball will roll over each strip, and the sensor/sensors over which it rolls can be detected by the temporary signal drop. The sensor identity and the time between signal drop in the first strip of IR sensors 26 and the second strip of IR sensors 30 can be used to define a velocity vector for the putt, from which the virtual trajectory for the putt is computed and is displayed on the display 2. In another embodiment, the camera 18 captures an image of the sports object in its initial position, and only one set or IR sensors 24 is used for determining velocity. In that embodiment, the position is determined by the signal drop when the sports object moves over an IR sensor 24.

In view of the above, one will appreciate that the developed embodiments overcome the problem of costly sports simulators. For example, embodiments allow for a simple inexpensive method of calculating the translational and rotational velocity of a sports object in order to produce the future trajectory of the sports object.

Those of skill will recognize that the various illustrative logical blocks and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present development.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. The scope of the development is indicated by the appended claims rather than by the foregoing description. All changes which come within the meaning and range of equivalency of the claims are to be embraced within their scope.

What is claimed is:

1. A system for computer generated sports simulation, the system comprising:
   a screen configured to have a sports object launched thereat and to display a future trajectory of the sports object thereon,
   a projector configured to project the future trajectory of the sports object on the screen;
   a launch area configured to have the sports object launched therefrom and toward the screen;
   one or more infrared strobe lights directed toward the launch area and coupled to a strobe controller;
   a triggering device coupled to the strobe controller to flash the infrared strobe lights and illuminate the launch area;
   a single camera, wherein the single camera is positioned over the launch area and configured to capture one or more images of the launch area illuminated by the one or more infrared strobe lights;
   one or more sensor planes located between the launch area and the screen; and
   a processor in data communication with the single camera, the one or more strobe lights, the triggering device, the strobe controller, and the one or more sensor planes, wherein the processor is configured to execute a set of instructions to perform a method comprising:
   detecting the launch of the sports object;
   flashing the infrared strobe lights to illuminate the launch area;
   capturing with the single camera one or more images of the illuminated launch area as the sports object is launched from the launch area;
   sensing passage of the sports object through the one or more sensor planes located between the launch area and the screen;
   determining, based at least in part on the sensed passage through the one or more sensor planes, one or more components of the translational velocity of the sports object;
   determining, based at least in part on the one or more images captured be the single camera, one or more components of rotational velocity of the sports object;
   computing the future trajectory of the sports object based at least in part on the one or more components of rotational velocity and the one or more components of translational velocity; and
   displaying the future trajectory of the sports object on the screen.

2. The system of claim 1, wherein the method further comprises:
   triggering a shutter of the camera;
   illuminating the launch area with pulsed infrared light from the infrared strobe lights; and
   capturing multiple images of the launch area on a single frame.

3. The system of claim 1, wherein the method further comprises:
   detecting overlapping images of the launch area; and
   discarding the overlapping images of the launch area.

4. The system of claim 1, wherein the method further comprises detecting the launch of the sports object.

5. The system of claim 4, comprising detecting with a motion detector.

6. The system of claim 4, comprising detecting with a microphone.

7. The system of claim 1, wherein the one or more sensor planes is formed by at least one emitter and at least one sensor.

8. The system of claim 7, wherein the at least one emitter is an infrared radiation emitter.

9. The system of claim 7, wherein the at least one sensor is an infrared radiation sensor.

* * * * *